United States Patent [19]
Von Meyer

[11] 3,781,013
[45] Dec. 25, 1973

[54] MAGNETIC TIC-TAC-TOE GAME
[76] Inventor: Walter G. Von Meyer, 1504 Port Jefferson Rd., Sidney, Ohio 45363
[22] Filed: Jan. 31, 1972
[21] Appl. No.: 222,130

[52] U.S. Cl. ............................ 273/130 B, 273/130 A
[51] Int. Cl. ............................................. A63f 9/00
[58] Field of Search ................ 273/134 A, 134 AB, 273/135 A, 136 A, 136 K, 137 A, 138 A, 153 R, 153 S, 1 M, 123 A, 126 A, 130 A, 130 B, 131 AD, 131 D, 134 AE, 135 AD, 136 B, 137 AE, 140; 46/238, 239, 240; 35/61, 66; 40/28 C

[56]  References Cited
UNITED STATES PATENTS

| | | | |
|---|---|---|---|
| 3,103,751 | 9/1963 | McDonald | 35/61 |
| 3,426,453 | 2/1969 | Dingwall et al. | 46/239 X |
| 3,526,975 | 9/1970 | Reeves | 35/66 X |
| 3,572,719 | 3/1971 | Span | 273/1 M |
| 3,543,146 | 11/1970 | Sherwood | 273/137 AE X |
| 2,708,580 | 5/1955 | Hamilton | 273/130 A |
| 2,819,904 | 1/1958 | Nelson et al. | 273/130 A |
| 2,590,002 | 3/1952 | Frazier | 273/1 M |
| 3,091,459 | 5/1963 | Lindman | 273/1 M |

FOREIGN PATENTS OR APPLICATIONS
1,185,949  2/1959  France .................... 46/239

Primary Examiner—Anton O. Oechsle
Assistant Examiner—Harry G. Strappello
Attorney—Arthur Raisch et al.

[57] ABSTRACT

A tic-tac-toe game in which the nine tic-tac-toe squares are represented by nine transparent compartments and the tic-tac-toe indicia are represented by magnetized discs having one color on one side and another color on the other side. Each compartment includes a transparent window and a pocket beneath and spaced from the window. Normally the colored magnetic discs are retained in pockets under transparent windows. The game is played by using magnetic wands having a color at one or both ends to match the colors of the magnetic discs, a disc being moved from its concealed position to a position under the window with the proper color corresponding to the color and polarity of the wand end being used.

5 Claims, 6 Drawing Figures

PATENTED DEC 25 1973    3,781,013
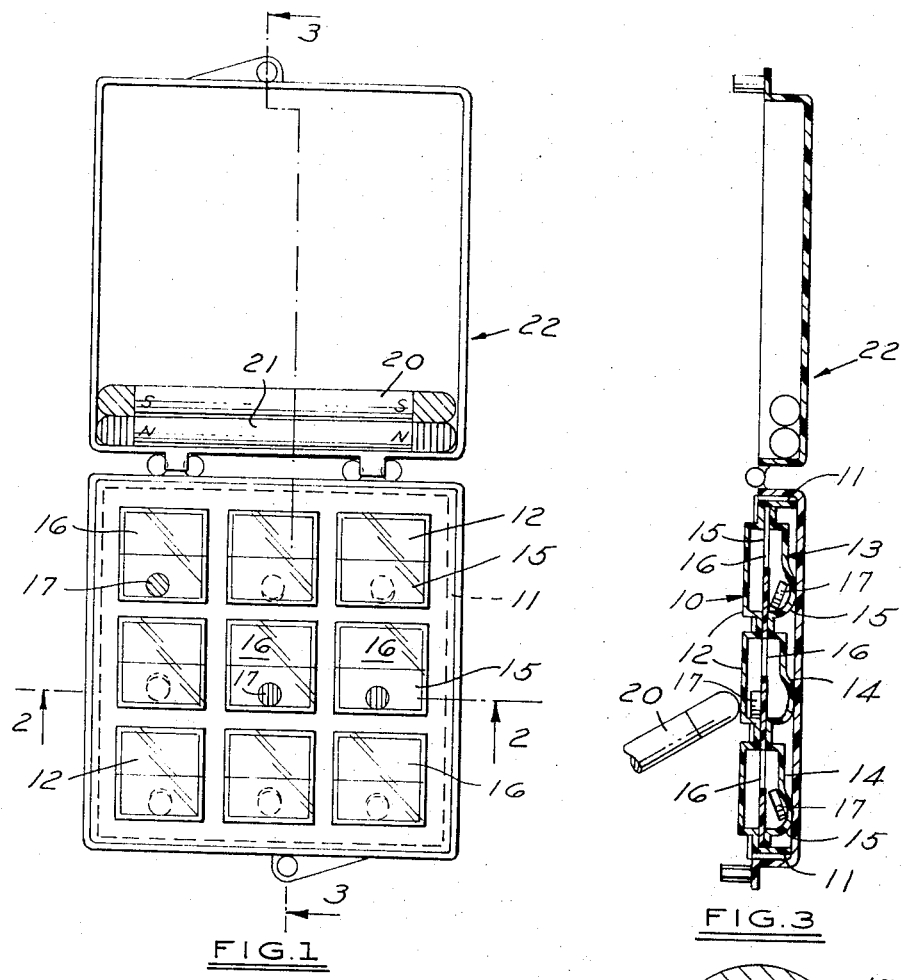
FIG.1
FIG.3
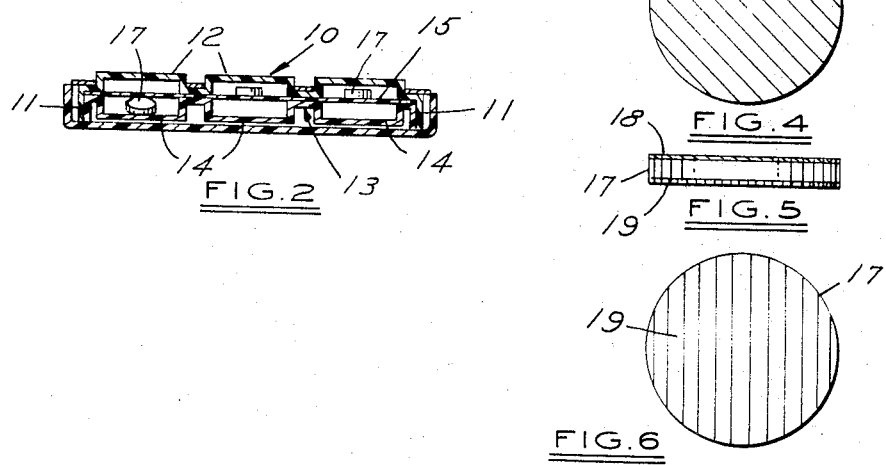
FIG.2
FIG.4
FIG.5
FIG.6

MAGNETIC TIC-TAC-TOE GAME

The principal object of my invention is to replace the normal x and o used in tic-tac-toe games with a single flat magnetic disc, normally hidden from view and having a different color on each side. In playing the game, each player has a magnetized wand, the operative end of which is colored and magnetized so as to move the disc and the corresponding colored side thereof into view.

More particularly, in carrying out my invention, I provide a transparent plate, preferably of plastic, having nine windows embossed in the face thereof. Aligned pockets are depressed in a second sheet of plastic and in between the pockets of the two sheets of plastic I provide an opaque partition covering each pocket. One magnetized disc having a different color on each side thereof is normally positioned in the compartment defined by a window and pocket and by using a selected magnetic wand the disc can be raised over the opaque partition and moved to a position on top of the partition and visible through the transparent window.

Another object of the invention is the shaping of the pocket for normally receiving and hiding the magnetic discs, whereby the discs are normally retained in position at an angle to assure easy and positive movement to an exposed position by means of the operator's magnetic wand.

DESCRIPTION OF THE DRAWINGS

FIG. 1 is an elevation of my magnetic tic-tac-toe game and showing three of the magnetic indicating discs in position.

FIG. 2 is a sectional view taken on line 2—2 of FIG. 1.

FIG. 3 is a sectional view taken on line 3—3 of FIG. 1.

FIG. 4 is an enlarged view of one side of the magnetized disc with one color.

FIG. 5 is an enlarged sectional view of a disc and indicating each surface in a different color.

FIG. 6 is an enlarged view of the opposite side of the disc shown in FIG. 4.

DESCRIPTION

The face of my game is preferably molded as a square transparent plastic unit 10 having an annular side frame 11 and rectangular depressed pockets 12 arranged as shown in FIG. 1. Fitting within the flanges 11 of the transparent member 10 is a second plastic unit 13 of substantially the same shape as the unit 10 and preferably opaque. This second rectangular unit is provided with nine compartments 14 positioned under the windows 12. Each compartment 14 has a pocket 15 extending transversely across the bottom of each compartment 14. These pockets 15 are preferably arcuate in cross section as best shown in FIG. 3.

A partition member 15 separates the two plastic members 10 and 13 and this partition member is preferably of opaque material and is provided with a series of cut out sections 16.

The magnetic discs or wafers 17 used in this tic-tac-toe game are preferably formed of thin ferrous plastic and preferably round in shape. The discs are magnetized and each side is provided with a different color; for example one side 18 being green and the other side 19 being red.

Operating wands 20 and 21 are provided, the ends of which are formed of magnets, the ends being colored so that the polarity of one end of the wand will attract the side of a disc 17 having a color like that of the rod.

In assemblying the game, I use an outer case 22, hinged in two halves. The outer half being of a size to snugly receive the two operating magnetic wands 20 and 21. The other half of the case being shaped to receive the parts 10, 13 and 15 with one magnetic disc being positioned in each set of pockets prior to assembly.

In playing the game it will be obvious that the group of nine discs may be moved to rest at an angle in the pockets 15. When the operator selects the one magnetic wand 20 with the color green for example, he will move the wand over the surface of the particular square he wishes in playing the tic-tac-toe game. It will be seen that the game can be played with the case in any position between horizontal and vertical. When the wand is moved across the window pocket, the green surface of the disc under the partition 16 will be attracted toward the wand and moved upwardly with the movement of the operating wand and will then be moved forwardly through the aperture 16. Then the operator will move the wand downwardly so that the disc is positioned on top of the partition with the proper color being visible to the operator. The other player of the game will then select the operating wand 21 with the color red for example, and move the finger 21 over the surface of another square or pocket to attract and move another disc upwardly and with the proper side of the disc then forwardly and into "locked" position. The discs may be returned to their concealed position by moving either operating rod 20 or 21 quickly across the surface, or the discs may be moved to their hidden position by tilting the case forward and back.

I claim:

1. A magnetic game comprising
   a magnetized indicia member having two surfaces of different color,
   a rear pocket for normally positioning said magnetized indicia member,
   a front pocket in front of said rear pocket and having a transparent portion,
   a stationary partition member separating said pockets and normally concealing said magnetized indicia member,
   and a magnetized operating wand for moving said indicia member over the top of the partition and into a visible portion of the front pocket,
   each magnetized indicia member being in the shape of a wafer.

2. A game as set forth in claim 1 wherein said rear pocket is so shaped as to maintain said wafer at an angle to the surface of the game.

3. A magnetic game as set forth in claim 2 wherein the two surfaces of said indicia member are of different polarity and wherein said magnetized operating wand is of a color corresponding to and adapted to attract the surface of said indicia member of the same color.

4. A magnetic game of the type described comprising a body having a plurality of compartments,
   each compartment including a transparent cover and a first area that is invisible through said transparent cover and an adjacent second area that is visible through the transparent cover, an indicating member normally positioned in the first area of each compartment and having at least a portion thereof magnetized, a magnetized operating wand operable to position one member and move said member between said first and second areas, one portion of said wand being operable to bring a first surface of one of said members into the visible area and another portion of said wand being operable to bring a second surface of said member into said visible area, said first and second surfaces having differing indicia thereon.

5. A magnetic game comprising two magnets of different polarity and color, a plurality of visible areas and concealed pockets, a plurality of magnetized indicia members, each freely movable and bodily rotatable while being normally concealed in respective ones of said concealed pockets, each said indicia member having two surfaces visibly distinguishable, one of said magnets being movable to a point adjacent one of said magnetized indicia members whereby to attract one surface of said indicia member or bodily reverse the position of said member and move the same from said concealed pocket to a visible areas, said magnetized indicia members being in the form of wafers having surfaces of a different color.

* * * * *